United States Patent [19]

Drori

[11] Patent Number: 5,098,565

[45] Date of Patent: * Mar. 24, 1992

[54] FILTER APPARATUS

[76] Inventor: Mordeki Drori, 89 Zahal Street, Kiron, Israel

[*] Notice: The portion of the term of this patent subsequent to Jun. 19, 2007 has been disclaimed.

[21] Appl. No.: 150,246

[22] Filed: Jan. 29, 1988

[51] Int. Cl.⁵ .............................................. B01D 29/46
[52] U.S. Cl. .................................. 210/346; 210/486; 210/488
[58] Field of Search ............... 210/346, 486, 487, 488, 210/489, 492

[56] References Cited

U.S. PATENT DOCUMENTS

| | | | |
|---|---|---|---|
| 428,307 | 5/1890 | Leland | 210/488 |
| 3,536,200 | 10/1970 | Gigliotti | 210/345 |
| 3,717,252 | 2/1973 | Picard . | |
| 4,059,518 | 11/1977 | Rishel | 210/333.1 |
| 4,288,330 | 9/1981 | Strub . | |
| 4,592,839 | 6/1986 | Rosenberg | 210/411 |
| 4,689,148 | 8/1987 | Timm et al. . | |
| 4,726,900 | 2/1988 | Keskinen . | |
| 4,740,302 | 4/1988 | Rosenberg | 210/392 |
| 4,744,901 | 5/1988 | Drori | 210/323.1 |
| 4,844,806 | 7/1989 | Drori . | |
| 4,880,537 | 11/1989 | Drori | 210/323.1 |
| 4,906,357 | 3/1990 | Drori | 210/143 |
| 4,935,126 | 6/1990 | Drori | 210/107 |

Primary Examiner—Robert A. Dawson
Assistant Examiner—Wanda L. Millard
Attorney, Agent, or Firm—Renner, Otto, Boisselle & Sklar

[57] ABSTRACT

A disk-type filter comprising a housing having an inlet connectable to an upstream pipe and an outlet connectable to a downstream pipe, and a stack of filter units disposed within said housing for separating solid particles from a fluid flowing between filter units in said stack of filter units from an upstream side of said stack of filter units to a downstream side thereof, characterized in that said stack of filter units includes a plurality of co-operating filter units defining a plurality of paired co-operating filter surfaces, including first and second surfaces each defining a plurality of fingers, said fingers defined by said first surface being arranged in registration with said fingers defined by said second surface, the exteriors of said fingers defined by said first and second surfaces communicating with either one of an upstream side and a downstream side and the interiors of said fingers defined by said first and second surfaces communicating with the other one of said upstream side or downstream side, spaces being defined in association with said fingers defined by said first and second surfaces and being disposed in registration so as to define channels, which permit particulate matter to become disengaged with said upstream side of said fingers defined by said first and second surfaces.

34 Claims, 18 Drawing Sheets

FILTER APPARATUS

FIELD OF THE INVENTION

The present invention relates to filter apparatus and systems generally and to techniques for operating such apparatus and systems.

BACKGROUND OF THE INVENTION

Various types of filters are known for filtering water and similar liquids. A particularly useful type of filter is a disk filter. Filters of this type are described and claimed, for example, in applicant's U.S. patent applications Ser. Nos. 647,094 which is now U.S. Pat. No. 4,624,785, filed Sept, 4, 1984; 709,371, filed Mar. 7, 1985 which is now; abandoned 709,372, filed Mar. 7, 1985 which is now U.S. Pat. No. 4,683,060; 709,373, filed Mar. 7, 1985 which is now U.S. Pat. No. 4,654,143; and U.S. Pat. Nos. 4,026,806; 4,042,504; 4,045,345; 4,271,018; 4,278,540; 4,295,963.

SUMMARY OF THE INVENTION

The present invention seeks to provide an improved filter for use in filtering fluids, such as water.

There is thus provided in accordance with a preferred embodiment of the present invention, a disk-type filter comprising a housing having an inlet connectable to an upstream pipe and an outlet connectable to a downstream pipe and a stack of filter units disposed within the housing for separating solid particles from a fluid flowing between filter units in the stack of filter units from an upstream side of the stack of filter units to a downstream side thereof, characterized in that the stack of filter units includes a plurality of co-operating filter units defining a plurality of paired co-operating filter surfaces, including first and second surfaces each defining a plurality of fingers, the fingers defined by the first surface being arranged in registration with the fingers defined by the second surface, the exteriors of the fingers defined by the first and second surfaces communicating with either one of an upstream side and a downstream side and the interiors of the fingers defined by the first and second surfaces communicating with the other one of the upstream side or downstream side, spaces being defined in association with the fingers defined by the first and second surfaces and being disposed in registration so as to define channels, which permit particulate matter to become disengaged with the upstream side of the fingers defined by the first and second surfaces.

According to a further preferred embodiment of the present invention, there is provided a filter unit comprising first and second surfaces defining a plurality of fingers, spaces being defined in association with the fingers defined by the first and second surfaces such that when a plurality of filter units are disposed in registration, the spaces define channels.

Further in accordance with a preferred embodiment of the present invention, the fingers defined by the first and second surfaces each have formed thereon a pair of spaced, generally raised line portions separated by an interior area, the raised line portions on at least one of the first and second surfaces defining a plurality of spaced grooves.

Still further in accordance with a preferred embodiment of the present invention, the filter also comprises a filter aid operatively associated with the stack of filter units.

Additionally in accordance with a preferred embodiment of the present invention, the pluralities of spaced grooves defined by the first and second surfaces define an enhanced depth filtering pathway.

Still further in accordance with a preferred embodiment of the present invention, there is provided a planar divider at the interior area of each of the fingers, such that when a plurality of filter units are disposed in registration, the line portions and the planar dividers define a multiplicity of backflow chambers for enhanced backflowing.

Further in accordance with a preferred embodiment of the present invention, the stack of filter units comprises a generally cylindrical element having an axial central bore along its longitudinal axis.

Still further in accordance with a preferred embodiment of the present invention, there is provided apparatus for providing a flushing fluid flow through the filter unit including a fluid discharge device arranged for axial movement along the bore.

Additionally in accordance with a preferred embodiment of the present invention, flushing chambers are defined between the line portions.

Further in accordance with preferred embodiment of the present invention, there is provided a plurality of axial connection elements which traverse the stack of filter units at locations intermediate inner and outer diameters of the stack of filter units.

Still further in accordance with a preferred embodiment of the present invention, there is provided a manifold defining the inlet and the outlet in communication with the bottom of the housing.

According to a further preferred embodiment of the present invention, there is provided a filter comprising a housing having an aperture at the bottom thereof, a filtering assembly disposed in the housing, and a manifold defining an inlet and an outlet in communication with the aperture.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
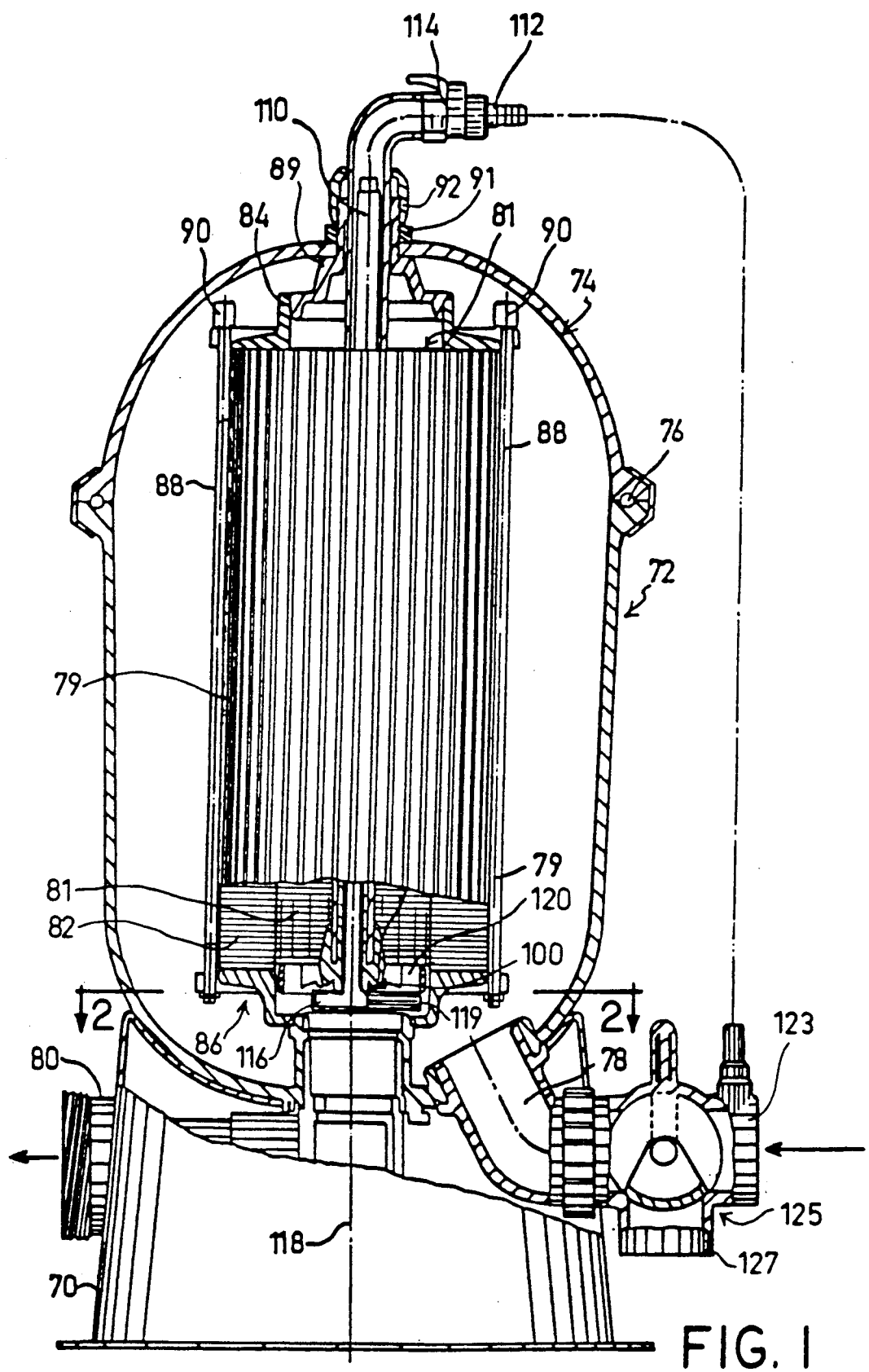
FIG. 1 is a partially cut-away side view sectional illustration of a filter constructed and operative in accordance with a preferred embodiment of the present invention.
Figure 2:
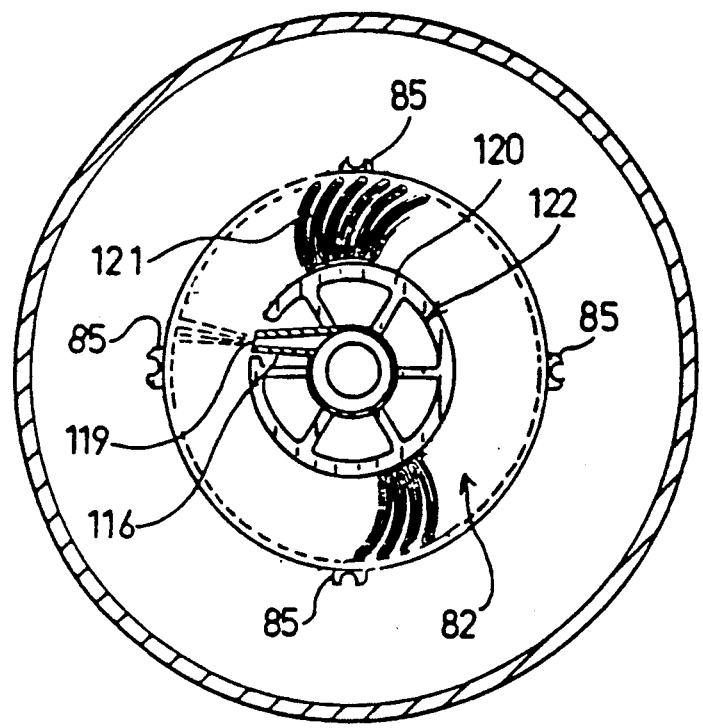
FIG. 2 is a sectional illustration taken along the lines II—II of FIG. 1.
Figure 3:
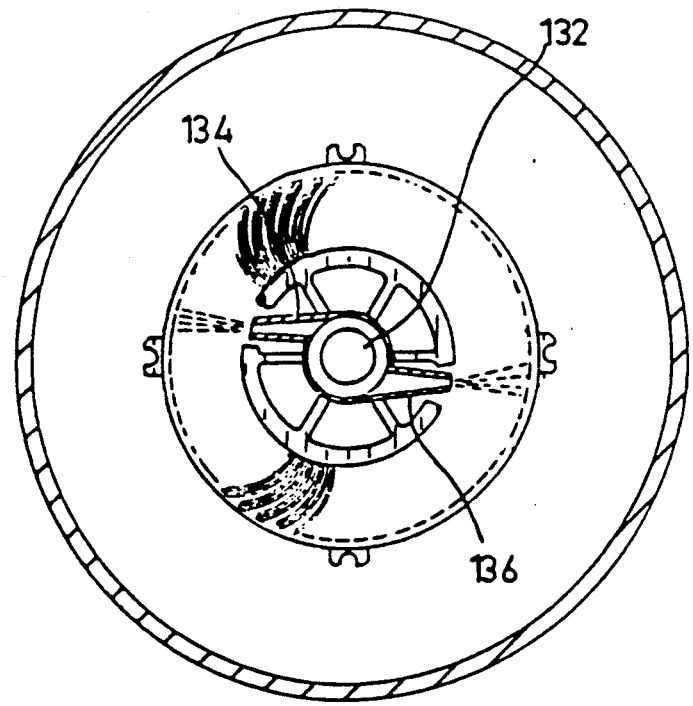
FIG. 3 is a sectional illustration corresponding to that of FIG. 2 but illustrating a dual nozzle variety of filter other wise similar to the single-nozzle variety shown in FIGS. 1 and 2.

Reference is now made to FIGS. 1, 2 and 3 which illustrate a filter constructed and operative in accordance with a preferred embodiment of the present invention and comprising a base 70 on which is fixedly supported a bottom housing portion 72. Removably mounted onto the bottom housing portion 72 is a top housing portion 74, which is maintained in sealing engagement therewith by means of a sealing ring 76.

A fluid inlet 78 is provided adjacent the bottom of housing portion 72 and communicates with the outside cylindrical surface, hereinafter termed the "upstream surface", of a stack of filter elements 79. A fluid outlet assembly 80 is coupled to housing portion 72 and communicates with a hollow interior portion 81 of stack of filter elements 79 adjacent the inner cylindrical surface of the stack of filter elements, hereinafter termed the "downstream surface".

The stack of filter elements 79 preferably comprises a stack of hollow center filter disks 82 of the type illustrated in FIGS. 4–9B and 12–15B.

The stack of filter elements 79 is preferably removably mounted in coaxial relationship so as to define volume 81 and is retained in suitably tight engagement by means of top and bottom retaining collars 84 and 86 joined by a plurality of threaded rods 88, typically four in number, and associated nuts 90. A retaining member 89 supports top retaining collar 84 and is sealingly mounted onto the top housing portion 74 by a threaded retaining ring 91. A collar member 92 engages retaining member 89. As seen in FIG. 2, each of the filter elements 82 is preferably formed with four locating protrusions 85, each formed to permit engagement with a rod 88. Thus it may be appreciated that rods 88 serve to maintain the filter elements 82 in precise azimuthal registration.

A focussed jet nozzle assembly 100 is disposed mainly within volume 81 and comprises a water supply shaft 110 having a water inlet 112 and an associated inlet valve 114.

A rotatable focussed jet outlet head 116 is arranged for relatively free rotation about a rotation axis 118 defined in shaft 110 and is provided with a single output aperture 119. Referring now to FIG. 2, it is seen that the outlet aperture is arranged to provide an eccentric water output jet which drives the outlet aperture 119 in rotary motion about axis 118, thus sequentially directing the output jet into each of the azimuthally separated backflow chambers 121 defined by the adjacent filter disks 82.

According to a preferred embodiment of the invention, there is provided above outlet aperture 119 a positioning ring 120, curved to correspond to the curvature of the inner, downstream, surface 122 of the stack of filter elements, for desired positioning of the focussed jet nozzle assembly 100 in volume 81, whereby the axis of rotation of the focussed jet outlet head 116 is centered with respect to cylindrical downstream surface 122, such that the output aperture 119 is always at a predetermined distance from the downstream surface 122, so as not to interfere with the rotation of focussed jet outlet head 116.

It may be appreciated that the focussed water jet exiting from outlet aperture 119 is forced into the individual volumes defined by the stack of filter elements facing the outlet aperture, providing efficient flushing of the accumulated solid material collected therein, and is not permitted to be spread out, which would result in a reduction of its strength and its backflowing efficiency.

The outlet aperture 119 is displaced up and down and rotated about axis 118, and the pressurized stream produced thereby is sequentially concentrated on individual filtering chambers 121 defined in the stack of filter elements to provide enhanced backflowing thereof.

As noted above, outlet aperture 119 is arranged to provide a radially directed concentrated backflowing jet, which serves to flush particulate matter from the stack of filter elements 79.

Inlet 112 is typically coupled via a flexible hose (not shown) to a backflow liquid supply which may be connected to a pressurized source of liquid to be filtered 123 which communicates with the inlet 78 via a two way valve 125. Alternatively the inlet 112 may be coupled to another source of high pressure fluid. Valve 125 selectably couples the water inlet 78 of the filter either to a pressurized water source or to a backflow liquid drain 127.

During normal operation of the filter of the present invention, focussed jet nozzle assembly 100 is located partly within volume 81 and shaft 110 is sealingly coupled to the top portion 74 of the housing by means of sealing collar 92 which sealingly engages threading on retaining member 89. Valve 125 is oriented as shown in FIG. 1 such that liquid to be filtered enters from the pressurized source and passes to inlet 78 and through the stack of filter elements 79 from the upstream surface to the downstream surface, being filtered in the process. The filtered liquid passes through volume 81. Valve 114 is closed.

During backflow operation, valve 125 is manipulated to close off the pressurized liquid source and to provide communication between inlet 78 and backflow drain 127. Valve 114 is opened to provide a pressurized flow of water to focussed jet nozzle assembly 100 and collar 92 is disconnected.

Focussed jet outlet head 116 is manually reciprocated axially along the interior of the stack of filter elements at the downstream surface and is rotated by the fluid stream eccentrically exiting therefrom through at least 360 degrees, causing a high pressure concentrated jet of water to enter the backflow chambers 121 from the downstream surface of the filter for dislodging accumulated filtered material from the upstream side of the stack of filter elements. This arrangement enables substantially all of the backflow chambers 121 to be thus scanned, region by region, by the concentrated jet for efficient backflow cleaning of the stack of filter elements.

Reference is now made to FIG. 3, which illustrates an alternative embodiment of the apparatus of FIG. 1, wherein a focussed jet outlet head 132 having two nearly but not exactly oppositely directed eccentric outlet apertures 134 and 136 is provided. According to a preferred embodiment, the two apertures 134 and 136 are arranged at different axial locations with respect to axis 118, thus providing nearly simultaneous flushing of chambers at two different axial locations along axis 118.

Reference is now made to FIGS. 4-9B, which illustrate a preferred embodiment of filter element constructed and operative in accordance with a preferred embodiment of the invention. The filter element is appropriate for use in any suitable filter apparatus, and is particularly useful in the filter apparatus described hereinabove.

Figure 4:
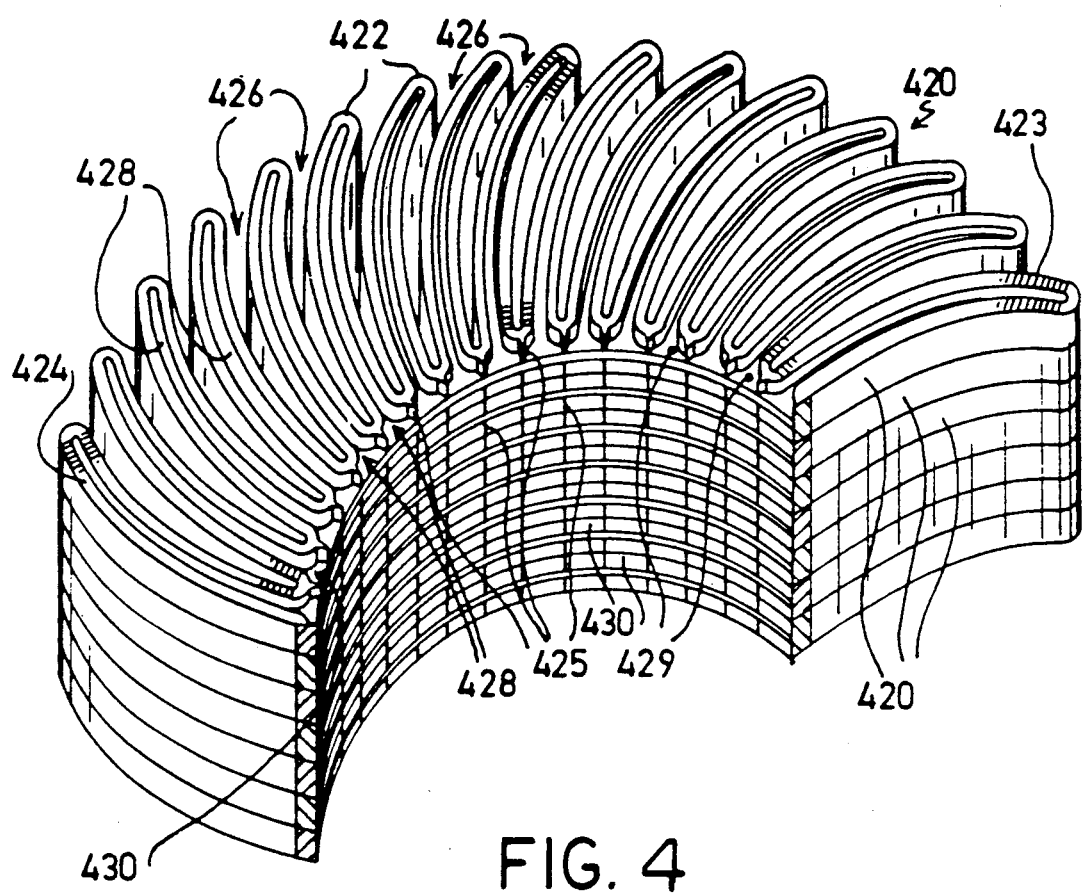
FIG. 4 is a pictorial illustration of the curved configuration of one of the stack of filter elements shown in FIG. 1.
Figure 5:
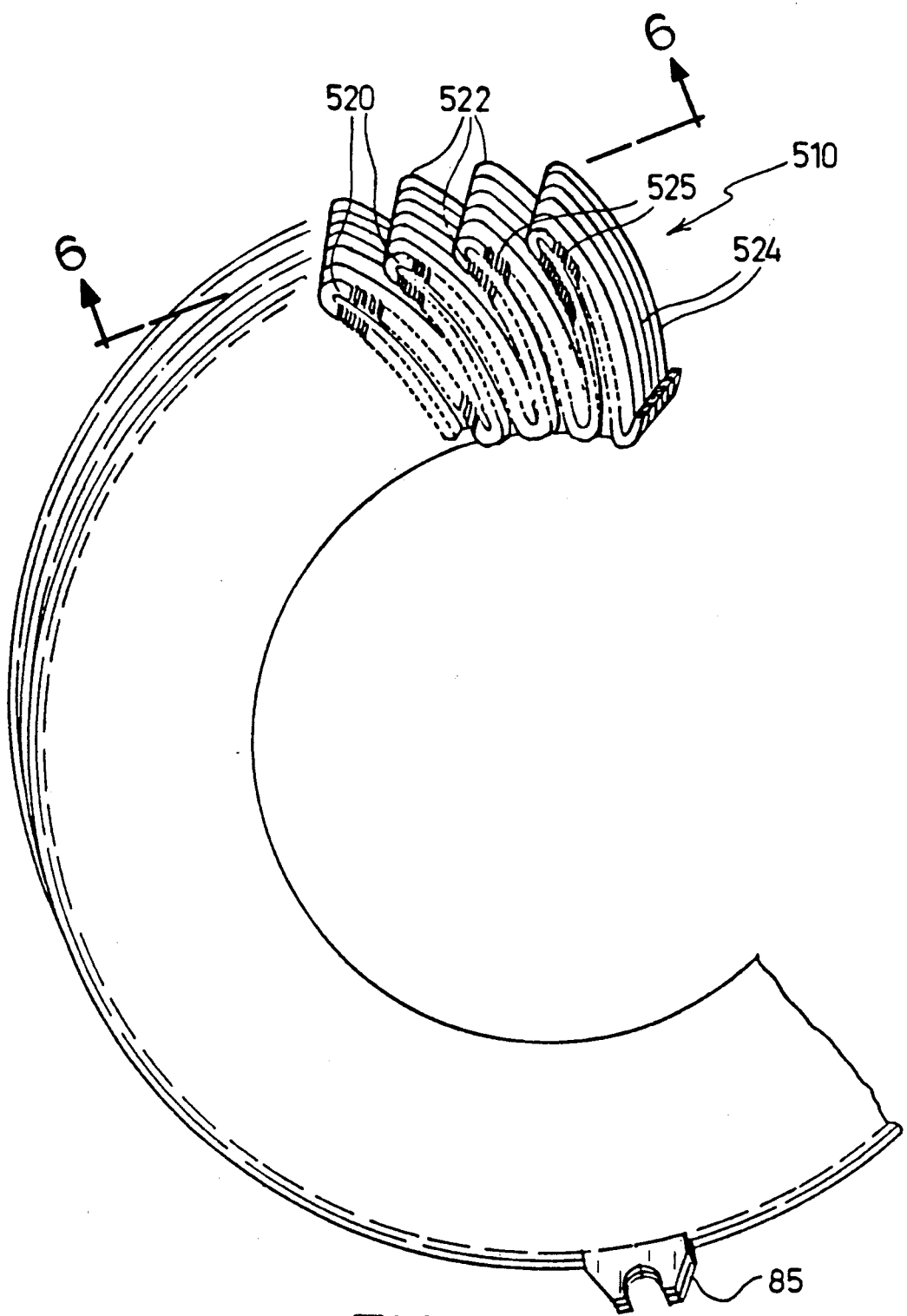
FIG. 5 is a pictorial illustration of a portion of a stack of filter elements of the type shown in FIG. 4.

FIG. 4 illustrates in plan view a portion of a filter disk 420 comprising a plurality of finger elements 422. It is seen that the configuration of the finger element 422 is preferably not exactly radial. Specifically, the outline of each finger element is curved along a portion of an arc. Each raised line portion 424 is configured as part of an arc about a different center, as illustrated in FIG. 4, for an exemplary embodiment.

According to a preferred embodiment of the invention, the line portion 424 is formed with a pointed end 425 adjacent the downstream side, thereby to minimize deflection of backflow streams impinging thereon.

The resulting configuration provides a relatively enhanced length of the line portion, and thus of the filter barrier per unit area of the filter element. It will be appreciated that the filter barrier defined by the raised line portion 424 defines a barrier between an upstream side of the filter, here typically the radially outward side of the line portion, and the downstream side of the filter, typically the radially inward side of the line portion. Accordingly, it may be understood that an increase in the length of the filter barrier per unit area of filter element provides a corresponding increase in the filtering capacity of the unit per unit area of filter element, and per unit volume of a filter assembly made up of a stack of such filter elements. The raised line portion 424 is formed with an array of grooves 423.

The spaces 426 between adjacent finger elements 422, which typically lie at the upstream side of the filter, define filtering volumes, which accomodate, according to a preferred embodiment of the invention, a filter cake.

At spaces 428, defined interiorly of each finger element 422, which typically lie at the downstream side of the filter, there are defined planar dividers 429, which are recessed with respect to both the line portions of the first and second surfaces, such that when a plurality of filter elements is arranged in registration in a stack, the planar dividers define a multiplicity of backflow chambers 430 for enhanced and concentrated backflowing. These backflow chambers are particularly suitable for pressurized backflow cleaning by the backflow focussed jet produced by the apparatus of FIGS. 1-3 described hereinabove.

It is a particular feature of the invention embodied in FIG. 4 that on the downstream side there are defined backflow chambers which concentrate the backflowing effect of a backflowing jet of pressurized fluid, while at the same time, at the upstream side, particulate matter dislodged from the filtering barrier is free to fall out of engagement with the filter stack.

Reference is now made to FIGS. 5-9B. The assembly shown in these figures comprises a stack of identical filter elements 510 being of the type illustrated in FIG. 4 and being formed of a plastic material, such as polypropylene. The filter elements comprise identically patterned opposite first and second planar surfaces. Except for grooves 423, the two planar surfaces of each filter element are mirror images of one another, such that the line portions thereof on both first and second surfaces thereof are in registration, as are the spaces between fingers and inside fingers. The grooves 423 on the facing raised line portions are preferably skewed with respect to one another.

Each planar surface of filter element 510 is formed with a filter barrier defined by a raised line pattern 520, which preferably is arranged to extend continuously in generally undulating configuration, defining a plurality of finger elements 522. The raised line pattern 520 typically defines the outline of each finger element 522 and may be configured to define a smooth outline or alternatively a notched or serrated pattern along the generally radially extending portion of each finger element 522.

As noted in connection with finger element 422 described hereinabove, the outline of each finger element is preferably curved along a portion of an arc. Each raised line portion is preferably configured as part of an arc about a different center, as illustrated in FIG. 4.

The resulting configuration provides a relatively enhanced length of the line portion, and thus of the filter barrier per unit area of the filter element. It will be appreciated that the filter barrier defined by the raised line portion 520 defines a barrier between an upstream side of the filter, here typically the radially outward side of the line portion, and the downstream side of the filter, typically the radially inward side of the line portion. Accordingly, it may be understood that an increase in the length of the filter barrier per unit area of filter element provides a corresponding increase in the filtering capacity of the unit per unit area of filter element, and per unit volume of a stack of such filter elements.

It is a particular feature of the present invention that the upstream side of the filtering barrier defined by raised line portion 520 is a relatively open volume, thus providing enhanced capacity for large particles during filtration and ease of particle disengagement during regeneration and backflowing, while at the same time providing efficient filtration of small particles.

In the embodiment of FIGS. 5-9B, the filter elements making up the stack of filter elements are maintained in precise azimuthal alignment, as by means of one or more azimuthal aligning protrusions 85 associated with each stack of filter elements and registered by a rod (not shown) passing therethrough. Accordingly, when the first and second planar surfaces are arranged in juxtaposed engagement, the finger elements 522 on the facing first and second planar surfaces of adjacent filter elements are in precise registration, defining a filter barrier between the upstream side of the filter and the downstream side. At the locations where the finger elements on first and second surfaces meet in touching engagement, grooves 525 on either or preferably both planar surfaces are engaged. Understanding of this engagement may be assisted by a consideration of FIG. 6, which is an enlargement taken along the lines VI—VI in FIG. 5.

Figure 6:
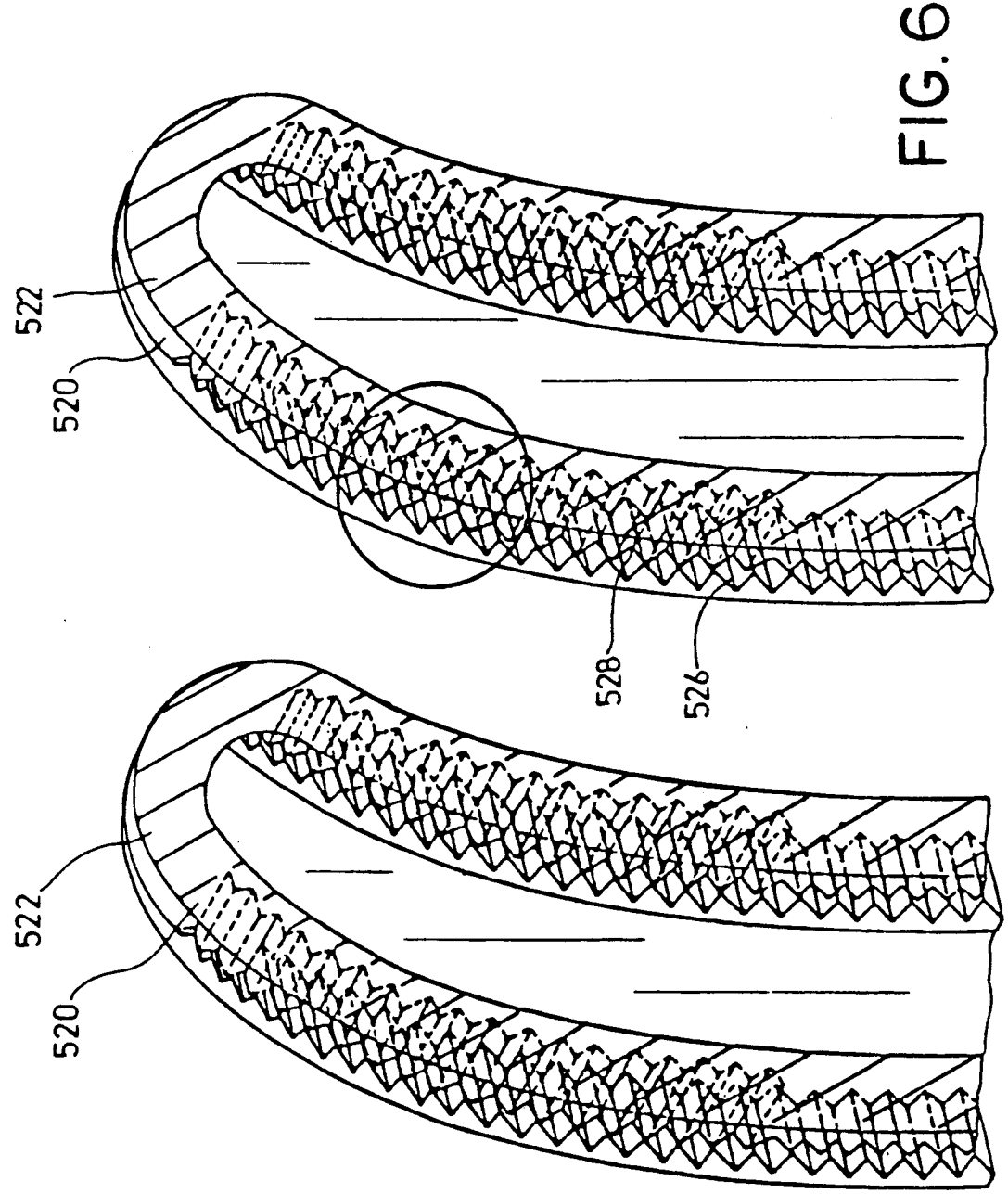
FIG. 6 is an enlarged illustration of a portion of the stack of filter elements illustrated in FIG. 5.

It is a particular feature of the present invention that where grooves are formed on both facing line portions, such grooves 526 and 528 on the opposite engaging surfaces are mutually skewed, as illustrated in FIG. 6, such that they define multiply intersecting paths for fluid flow therethrough, there being defined at intervals along the pathway a particle size gauge being the cross section of the single groove.

This configuration has a number of advantages, including the fact that along much of the pathway from the upstream side to the downstream side across the engaged first and second surfaces, the pathway is larger than the particle size gauge due to the effective combination of grooves formed on the opposite facing surfaces. The multiple interconnections between grooves provides multiple alternative paths for fluid, such that fluid flow may continue notwithstanding blockage of certain passageways. The relatively long and intricate pathway of the fluid provides enhanced depth of filtering, thus increasing filtering efficiency.

Figure 7:
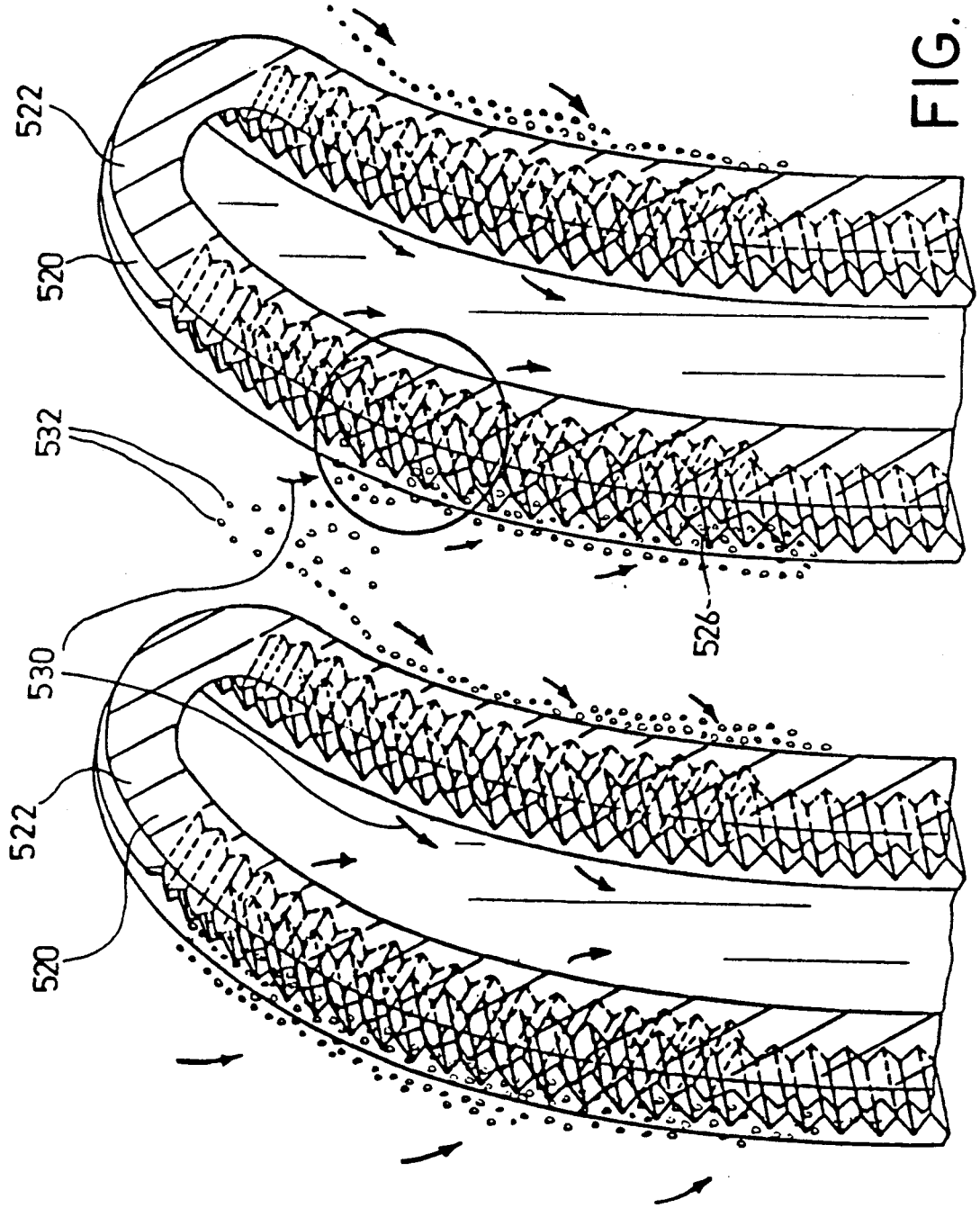
FIG. 7 is an enlarged illustration of a portion of the stack of filter elements illustrated in FIG. 5, also showing filter cake and/or sediment associated therewith.

Reference is now made to FIG. 7, which corresponds to FIG. 6 but also shows the presence of filter cake and/or sediment during operation of the filter. The illustration shows an embodiment wherein the upstream side is radially outward of the raised line portion 520 and thus intermediate finger elements 522 while the downstream side is at the radially inward side of the raised line portion 520 and thus communicates with the area and volume interior of each finger element 522.

It is seen that fluid, such as water, carrying particulate matter, enters from the upstream side, as indicated by arrows 530, and deposits the particulate matter 532 upstream of the raised line portion 520.

It may additionally be appreciated that a filter aid such as diatomaceous earth, activated carbon or a filter cake may be employed and disposed at the upstream side of the stack of filter elements, as illustrated.

Figure 8:
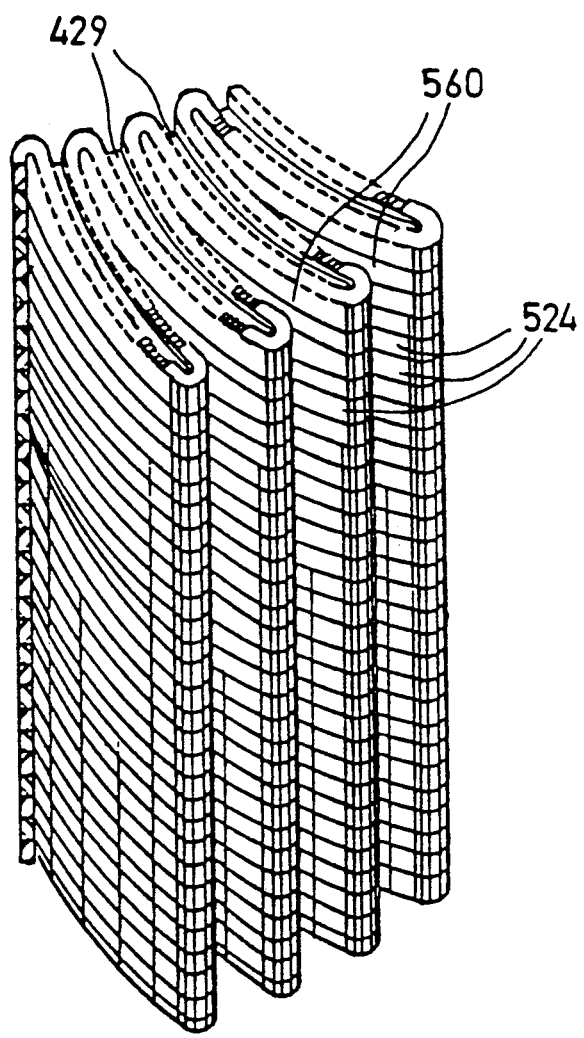
FIG. 8 is an illustration of part of the stack of filter elements illustrated in FIG. 5, illustrating the channels between finger elements thereof.
Figure 9A:
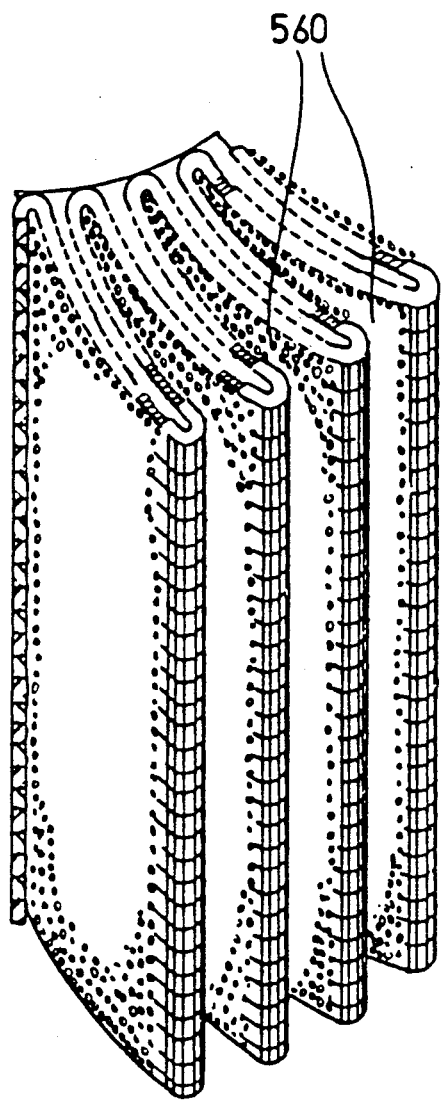
FIGS. 9A and 9B correspond to FIG. 8 and illustrate the part of the stack of filter elements with filter aid meterial in association therewith and with the filter aid material having fallen therefrom respectively.
Figure 9B:
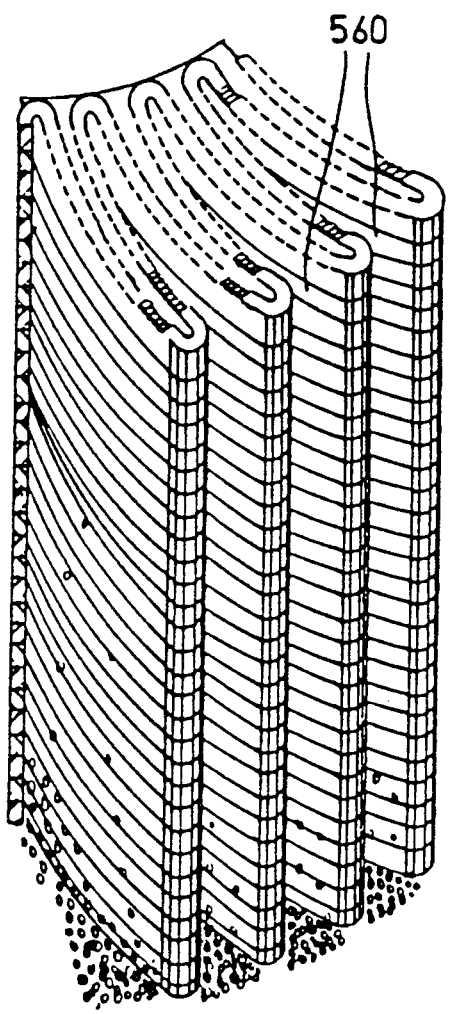

It is a particular feature of the present invention that the spaces between adjacent fingers 522 are open, such that when a plurality of filter disks 510 are stacked with the fingers 522 in registration, channels 560 are defined between adjacent fingers, as seen in FIGS. 8-9B. These channels have particular importance when a filter aid, such as a filter cake, is employed, as the filter cake may be located on the upstream surface of the filter disks 510 along the periphery of the fingers 522.

Assuming that the stack of filter disks 510 is arranged generally vertically, it may be understood that when flow of fluid through the filter from the upstream side to the downstream side is terminated, the filter aid and accumulated filtered out particulate material, which during filtering is stuck onto the peripheral edges 524 of the fingers, as seen figuratively in FIG. 9A, tends to fall through the channels 560 to the bottom of the filter housing, as seen figuratively in FIG. 9B.

Figure 10:
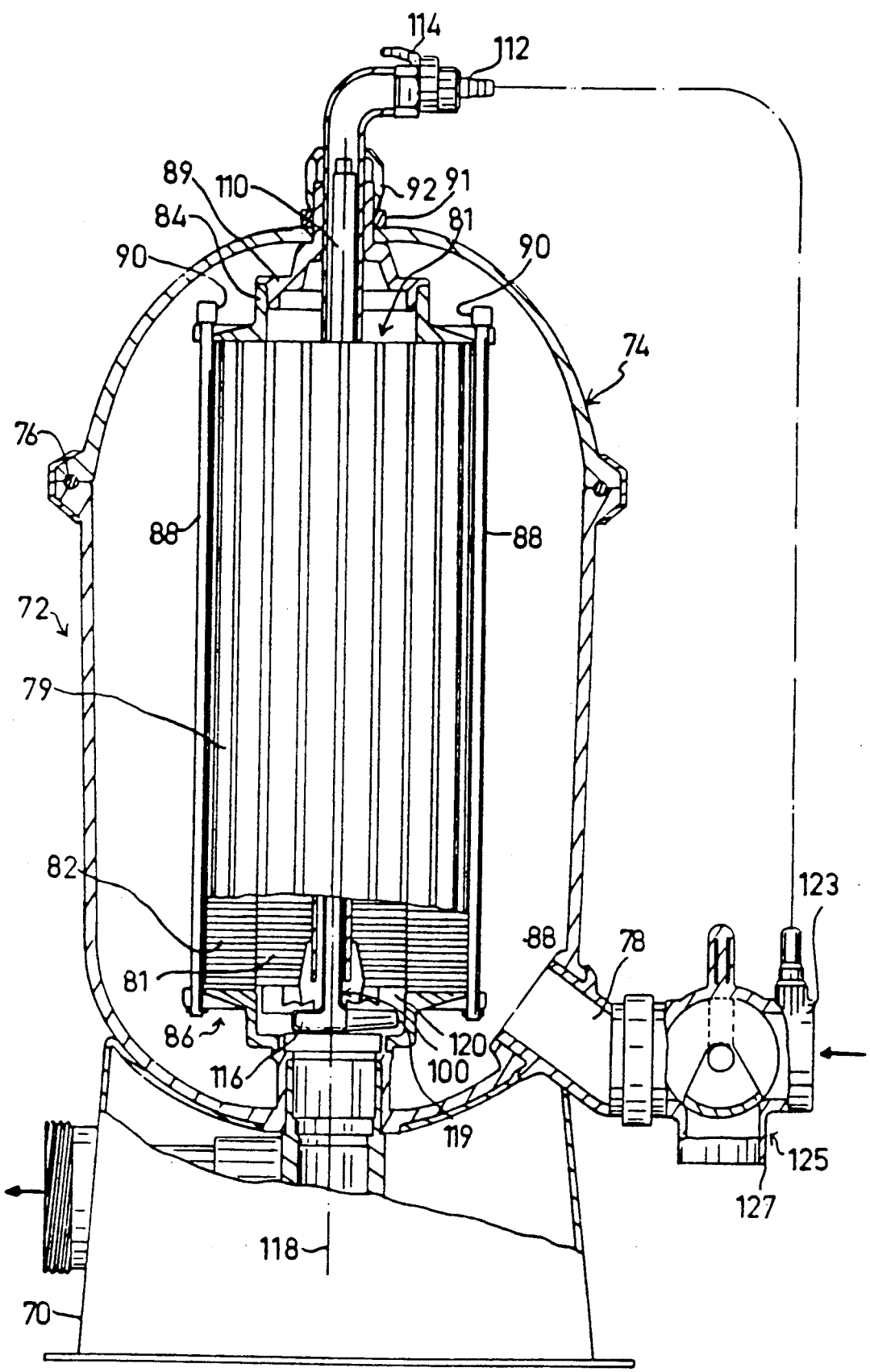
FIG. 10 is a partially cut-away side view sectional illustration of a filter constructed and operative in accordance with a preferred embodiment of the present invention and arranged to define a drain outlet which is spaced from the bottom of the upstream side of the housing.

Reference is now made to FIG. 10, which illustrates an alternative embodiment of filter, which is identical to that illustrated in FIG. 1 with the exception of the location of fluid inlet 78. It is noted that in the embodiment of FIG. 1, the inlet 78 also functions as a backflow drain and lies somewhat spaced from the bottom of the housing 72. In FIG. 10, the location of the inlet 78 is spaced relationship with the bottom of the housing 72 is emphasized. It will be appreciated by persons skilled in the art that the arrangement of FIG. 10 may replace that of FIG. 1 in all the embodiments of the invention illustrated in FIGS. 2-9B. FIG. 10 is also illustrative of a broader concept which is not limited to disk filters or to filters having a backflow arrangement.

Upon termination of liquid flow through the filter assembly, the liquid drains to the bottom of the housing, and the particulate matter, including filter aid material and solid particles separated from the liquid, falls into the liquid, the filter aid material falling to the bottom of the housing and the solid particles floating in or on the liquid, such that at least some of the filter aid material is retained in the housing while the solid particles are flushed out the drain.

Upon resumption of pressurized liquid flow through the filter assembly, the filter aid becomes distributed on the upstream side of the filter assembly and carries out its normal function, having thus being cleaned, reoriented and recycled.

The drain may be separate from the inlet or identical therewith. In the latter case, the filter apparatus preferably comprises a manually operable multi-flow valve 125 having a normal position wherein liquid to be filtered is coupled to the upstream side of the filter assembly and a backflow position wherein liquid to be filtered is prevented from reaching the upstream side and wherein the drain communicating with the upstream side is coupled for draining to the atmosphere.

Figure 11:
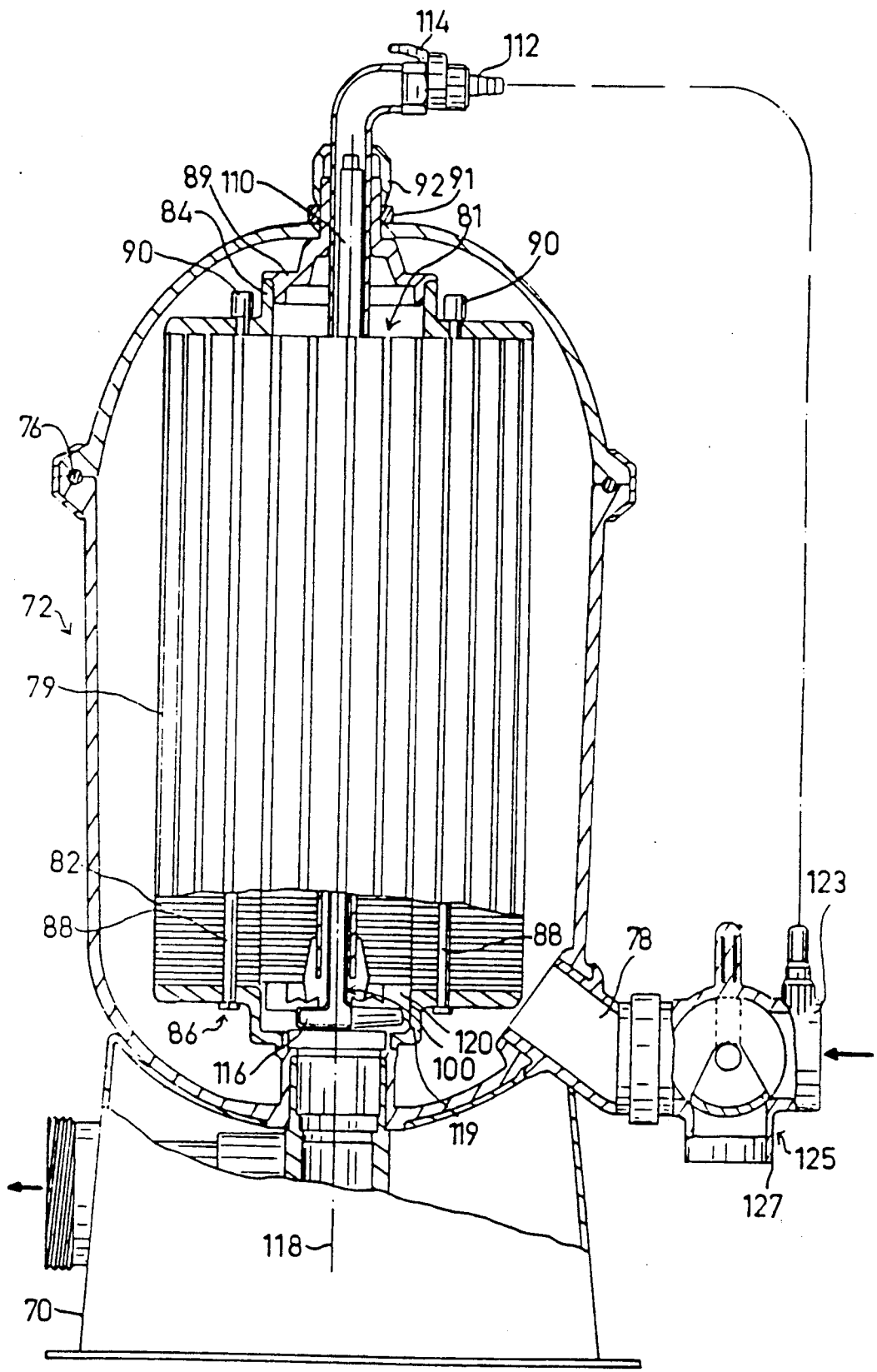
FIG. 11 is a partially cut-away side view sectional illustration of a filter constructed and operative in accordance with another preferred embodiment of the present invention, arranged to define a drain outlet which is spaced from the bottom of the upstream side of the housing and to include filter stack supports which traverse the filter disks intermediate the upstream and downstream surfaces of the filter disks.

Reference is now made to FIG. 11, which illustrates an alternative embodiment of filter, which is generally identical to that illustrated in FIG. 10 with the exception of the locations of rods 88. In the embodiment of FIG. 11, the rods 88, which tightly secure the filter disks 82 together in stack 79, are disposed intermediate the inner and outer diameters of the stack. This arrangement of rods 88 eliminates interference with backflowing which would occur were the rods 88 located inwardly of the downstream surface of the stack 79 and also eliminates the waste of volume in the housing which would result were the rods 88 to be located outwardly of the upstream surface, as shown in the embodiment of FIG. 10. Thus, the embodiment of FIG. 11 maximizes the relationship between stack diameter and inner diameter of the housing.

The embodiment of FIG. 11 is characterized in that it includes a stack of filter elements 79, or any other suitable filter assembly, which is configured to permit particulate matter to fall out of engagement with the upstream side thereof to the bottom of the housing in the absence of liquid flow through the filter assembly. It is appreciated that the foregoing is also true for the embodiments of FIGS. 1–9B.

Figure 12:
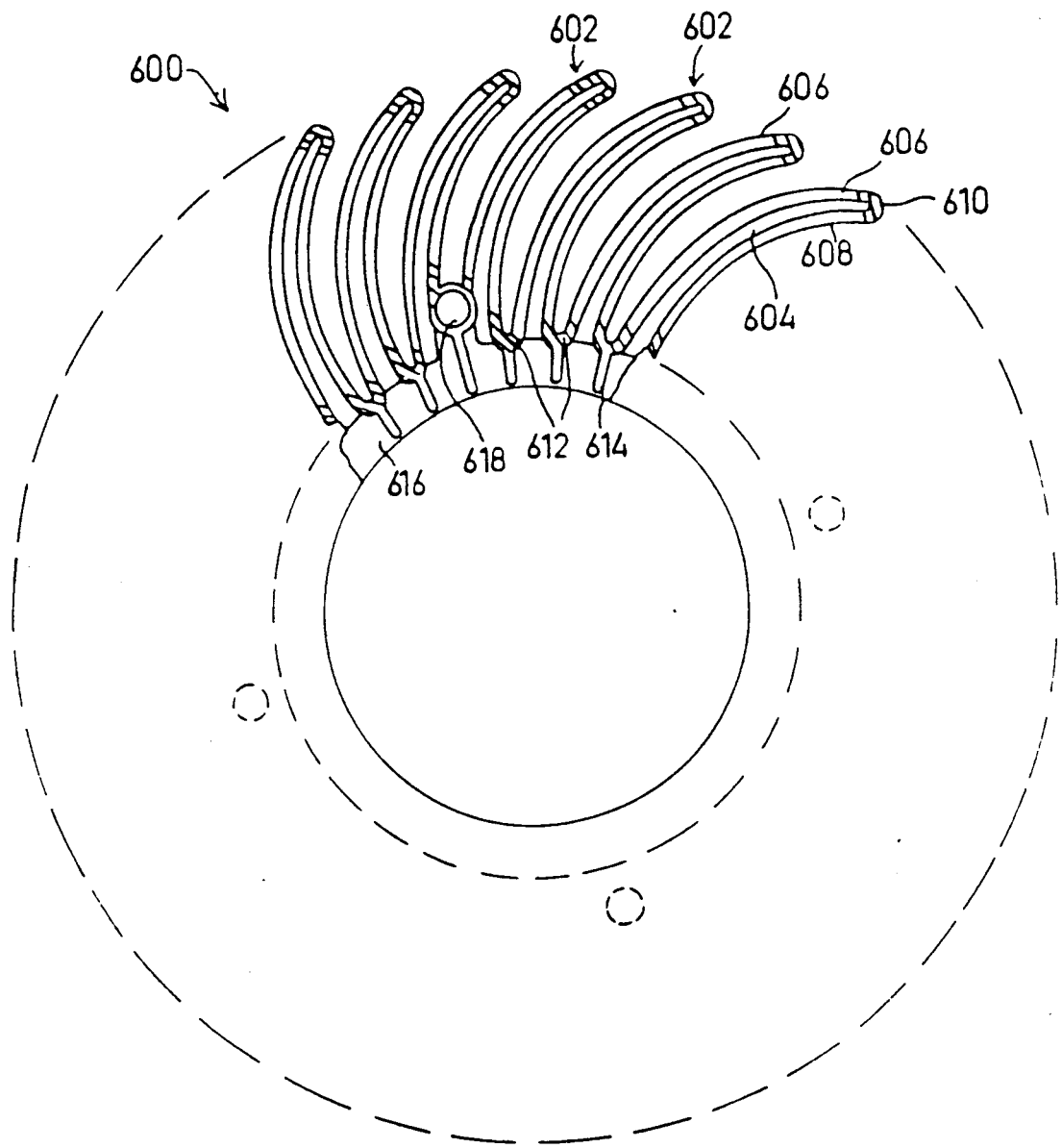
FIG. 12 is a planar view illustration of a filter disk constructed and operative in accordance with a preferred embodiment of the invention for use in the apparatus of FIG. 11.

Reference is now made to FIG. 12, which illustrates a filter disk 600 constructed and operative in accordance with a preferred embodiment of the present invention. Filter disk 600 is generally identical to that illustrated in FIGS. 5–8 hereinabove, with the exceptions described hereinbelow:

Filter disk 600 is formed with a plurality of finger elements 602 having a non-radial configuration curved along a portion of an arc. Each finger may be seen to include a line portion 604, which corresponds generally to line portion 424, described above in connection with FIG. 4. The line portion 604 for each finger may be considered to include an outwardly facing portion 606 and an inwardly facing portion 608, joined by an outward curved portion 610 and an inward curved portion 612.

According to a preferred embodiment of the present invention, the outwardly facing portion 606 is longer than the inwardly facing portion 608, such that application of a positive pressure gradient from the upstream side of the stack, here the outside thereof, to the downstream side of the stack, here the inside thereof, as during normal filtering operation, causes inward bending of the fingers 602 in a clockwise sense for the configuration as illustrated in FIG. 12. Removal of the pressure gradient, as upon termination of the supply of pressurized fluid to be filtered, allows fingers 602 to snap back to their original positions.

Further in accordance with a preferred embodiment of the invention there exists a very small difference in thickness of the filter element between its radially inward portion and its extreme radially outward portions, whereby the thickness of the radially outward portions is very slightly less than that of the radially inward portion. This difference in thickness permits the finger elements 522 of adjacent filter elements to be slightly spread apart in a direction parallel to axis 118 (FIG. 1) in response to the application of a backflow jet to the volume interior of each finger element. This spreading apart assists in the disengagement of particles accumulating from the stacked filter elements but is not sufficient to permit entry of small particles into the filter stack during normal filtering flow from the upstream side to the downstream side.

Additionally in accordance with a preferred embodiment of the present invention, adjacent each of the inward curved portions 612 there is provided a narrow, radially extending structural member 614, which extends nearly but not completely to the inner edge of the disk 600. Structural members 614 provide necessary structural support for the disks 600 while also functioning to define backflow chambers 616 between adjacent members 614. These backflow chambers 616 are relatively broad adjacent the downstream side of the stack for minimum interference with a jet of backflow fluid and then narrow as they extend between respective outwardly facing and inwardly facing line portions 606 and 608.

Additionally in accordance with a preferred embodiment of the present invention, and as noted above in connection with FIG. 11, accomodation is made for transversely extending rods 88, in the form of sockets 618 which are located intermediate the inner and outer diameters of the disk 600. According to a preferred embodiment of the invention, as illustrated in FIG. 12, the socket 618 is located in communication with the upstream side of the disk 600 and is arranged as an enlargement of inward curved portion 612, so as to minimize interference with backflowing while minimizing the loss of filter surface area, at the socket.

Figure 13B:
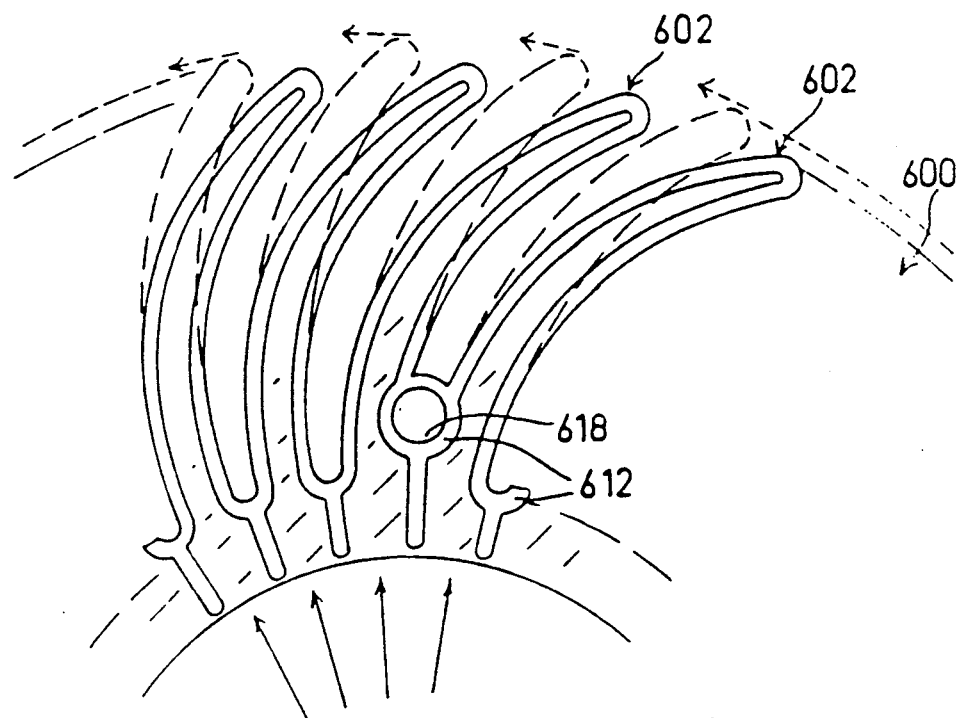
FIGS. 13A and 13B are first and second illustrations showing, in exaggerated form, the bendability of the fingers defined by the filter disk of FIG. 12 under respective filtration and backflowing conditions.
Figure 13A:
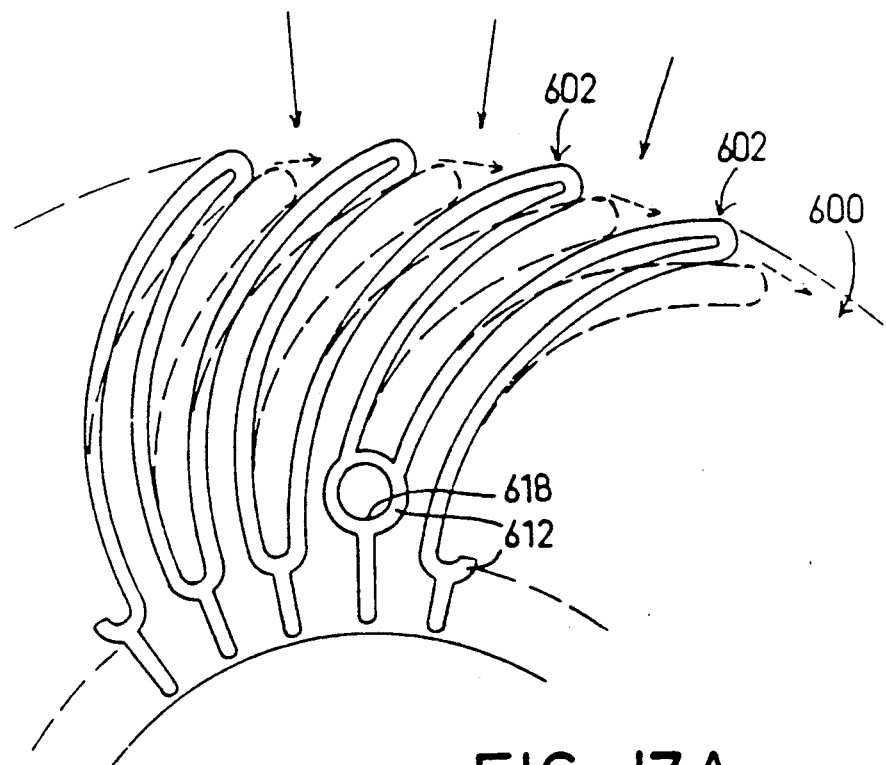

Reference is now made to FIGS. 13A and 13B which illustrate the bending and snap back action of the fingers 602 in accordance with the present invention. In FIG. 13A, the normal orientation of fingers 602, i.e. in the absence of an applied pressure gradient, is illustrated in solid lines, while the bent position thereof, shown in exaggerated form for the purpose of illustration only, is illustrated in broken lines. In fact the angular displacement of the outer ends of the fingers is quite small and is a function of the materials used for the filter elements and of the operating pressure in the filter. In FIG. 13B, opposite bending upon backflowing is illustrated, with the normal orientation of fingers 602 being shown in solid lines and the angular displacement of the outer ends of the fingers during backflowing being shown in broken lines.

It is a particular feature of the present invention that the bending of the fingers, which occurs upon termination of normal filtering and also typically upon the onset of backflowing at a given region, serves to enhance disengagement of particles from the surface of the filter disks 600.

Backflowing, which normally will not occur each time there is a termination of normal filtering, is typically accompanied by additional bending in an opposite sense from the bending produced under normal filtration operation, and thus produces enhanced disengagement of the filter aid material from the stack.

It is also noted that upon backflowing, the fingers of adjacent disks are slightly separated from each other, thus enabling the space between the grooves 526 and 528 to be locally and temporarily enlarged for enhanced backflowing.

Figure 14:
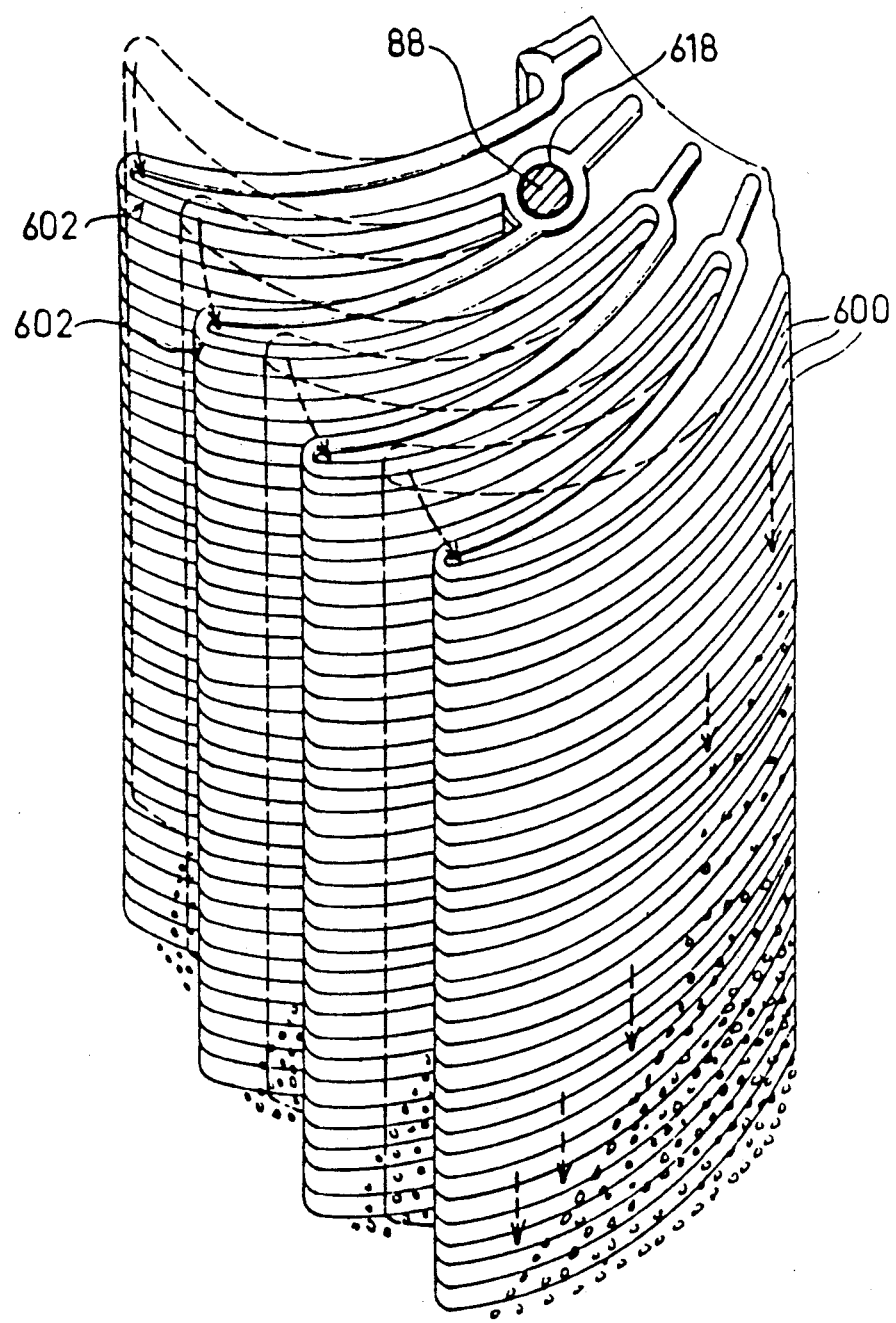
FIG. 14 is a pictorial illustration of a portion of a filter stack including filter disks of the type illustrated in FIG. 2, and illustrating, in exaggerated form, the disengagement of filter aid material from the filter stack as the fingers snap back upon termination of the application of a pressure gradient thereacross.

FIG. 14 illustrates pictorially the disengagement of filter aid material from a stack of filter disks when the fingers 602 snap back from their bent positions (shown in broken lines) to their normal positions (shown in solid lines).

Figure 15A:
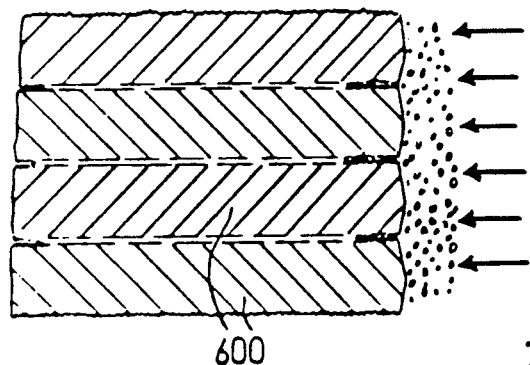
FIGS. 15A and 15B are enlarged sectional views of a portion of the filter stack of FIG. 14 respectively during filtration and during regeneration or backflowing.
Figure 15B:
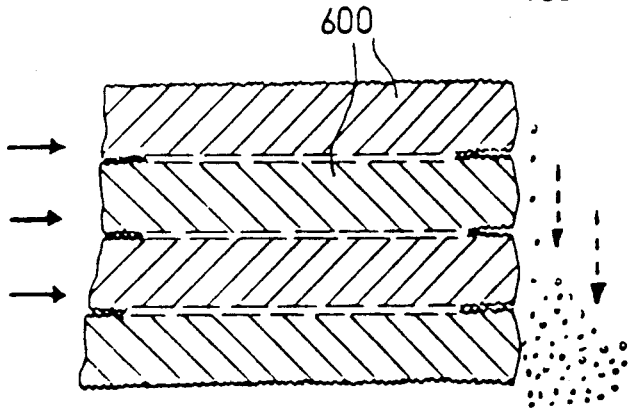

FIGS. 15A and 15B are enlarged sectional illustrations of this phenomenon, showing the buildup of dirt and accumulation of filter aid material prior to disengagement (FIG. 15A) and following disengagement (FIG. 15B).

It will be appreciated that the filter assembly may comprise any suitable filtering element or assembly of elements although a stack of filter disks as described hereinabove is preferred. A backflowing arrangement as described hereinabove is useful in association with the filter aid retaining arrangement described hereinabove but is not required.

Reference is now made to FIGS. 16–19, which illustrate an alternative embodiment of the present invention wherein a central inlet and outlet manifold is provided.

Figure 16:
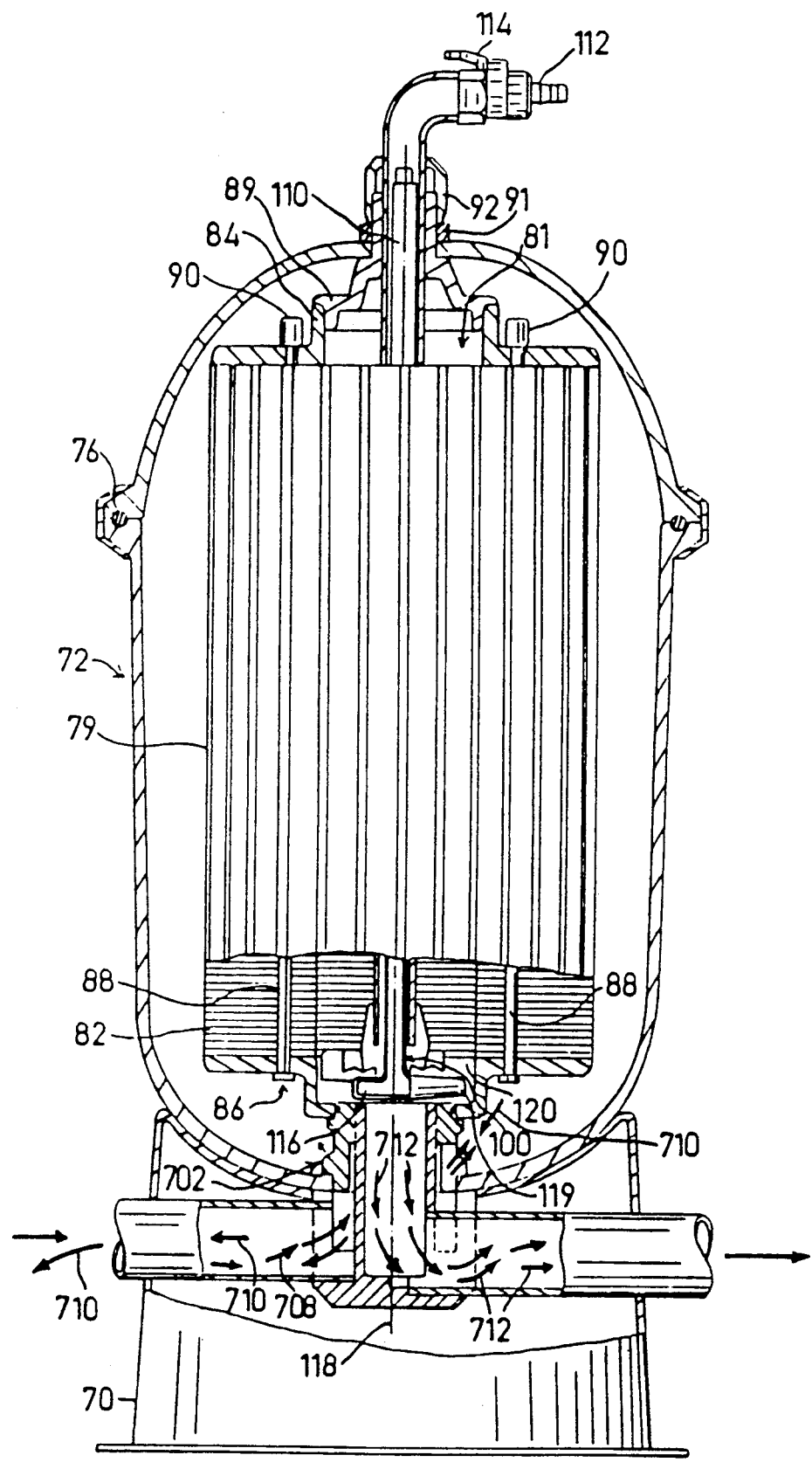
FIG. 16 is a partially cut-away side view sectional illustration of a filter constructed and operative in accordance with yet another preferred embodiment of the present invention, arranged to define a central drain outlet and fluid inlet manifold and to include filter stack supports which traverse the filter disks intermediate the upstream and downstream surfaces of the filter disks.

The embodiment of FIG. 16 is generally identical to that shown in FIG. 11 with the following exception:

Disposed at the very bottom of the housing 72 is an inlet and outlet manifold 702 which is coupled to a fluid inlet/backflow drain conduit 704 and to a filtered fluid outlet conduit 706. Fluid inlet/backflow drain conduit 704 is typically connected to a three position valve such as valve 125 shown in FIG. 11.

Fluid communication from a source of pressurized fluid via valve 125 (not shown) to the upstream surface of the filter assembly is illustrated by arrows 708. Fluid communication from the upstream side of the filter assembly to the backflow outlet is illustrated by arrows 710. Fluid communication from the downstream side of the filter assembly to filtered fluid outlet conduit 706 is illustrated by arrows 712.

Figure 18:
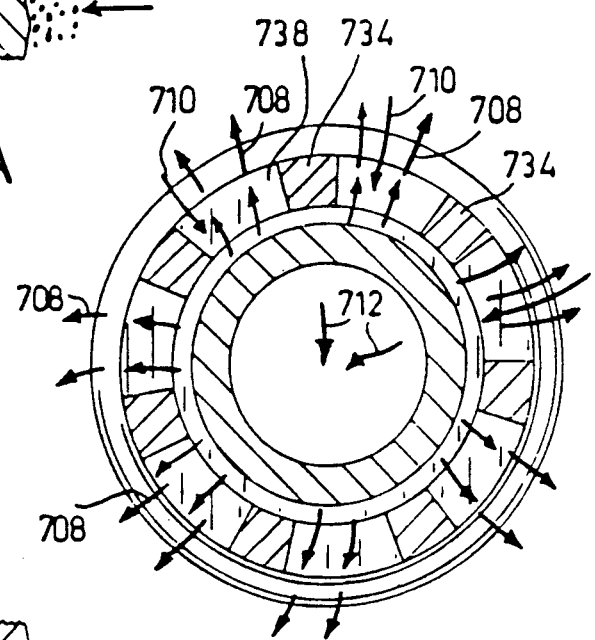
FIG. 18 is a sectional illustration taken along the lines XVIII—XVIII of FIG. 17.
Figure 19:
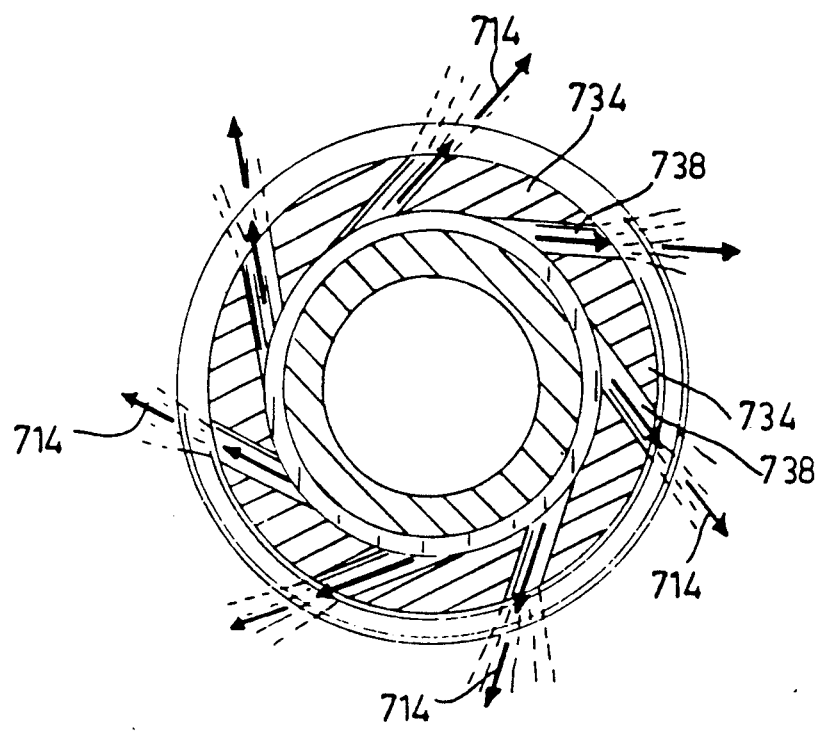
FIG. 19 is a sectional illustration of an alternative embodiment of central drain outlet and fluid inlet manifold constructed and operative in accordance with a preferred embodiment of the present invention.

According to one embodiment of the invention, the manifold is provided with radially extending outlets, as shown in FIG. 18. According to an alternative embodiment of the invention, the outlets may be arranged as illustrated in FIG. 19 to provide a tangent flow. In FIG. 19, this tangent flow of fluid to be filtered into the housing is illustrated by arrows 714.

Referring now to FIGS. 16-19, the structure of the manifold 702 will now be described. The manifold comprises a body member 721 which is connected to conduit 704 and which defines an annular inlet passage 722, communicating with conduit 704. Body member 721 also defines a central outlet passage 724 which communicates with outlet conduit 706.

A collar member 728 threadably engages corresponding threading on the body member 721 and is operative to secure the manifold in sealing engagement with an aperture 730 formed at the bottom of housing 72, by means of a sealing ring 732.

Figure 17:
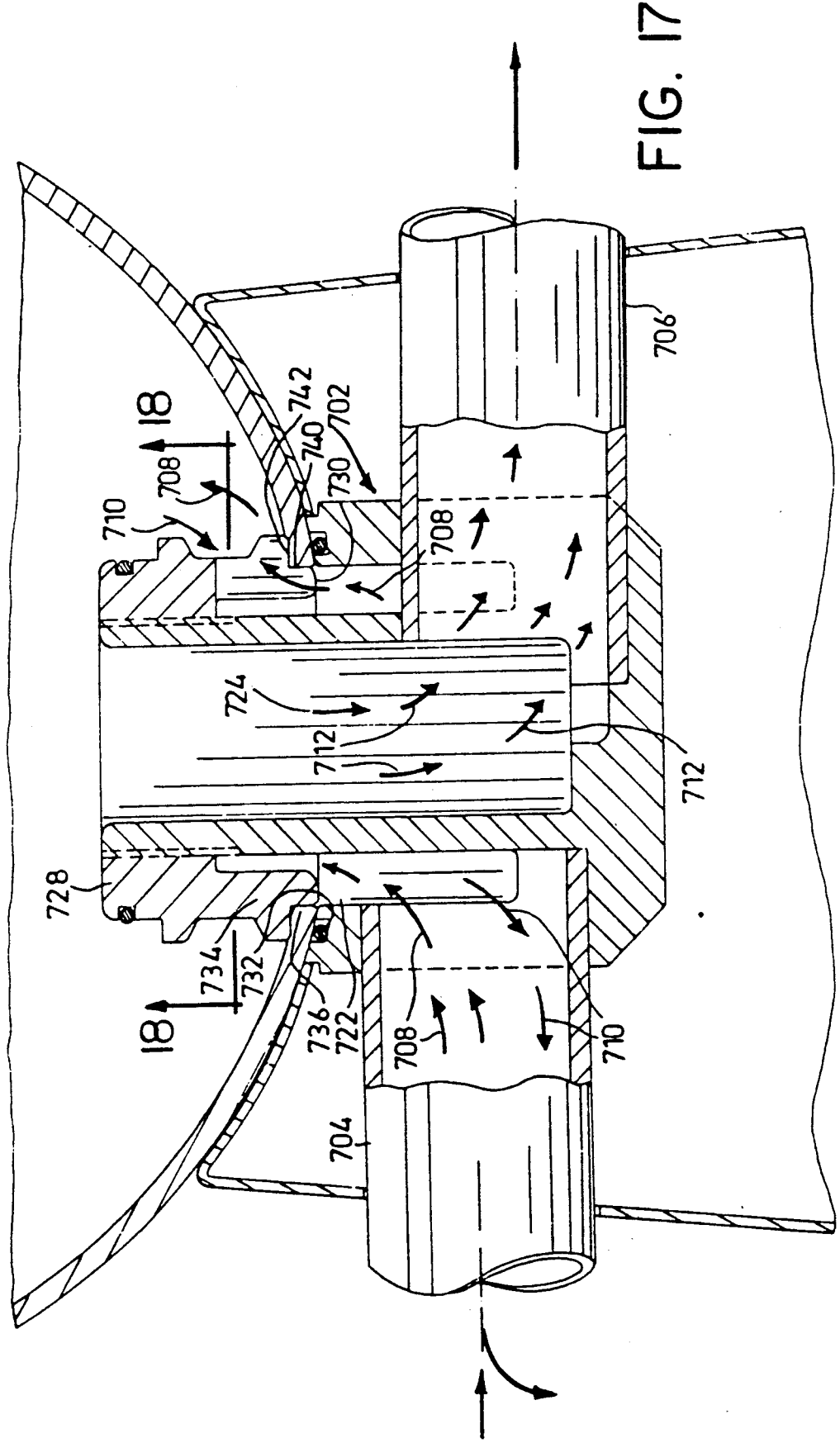
FIG. 17 is an enlarged illustration of the central drain outlet and fluid inlet manifold of FIG. 16.

As seen in FIG. 17 and FIGS. 18 or 19, the collar member 728 comprises a plurality of upstanding members 734 which define shoulders 736 which seat on the bottom of the housing 72 at the periphery of aperture 730. Defined between adjacent upstanding members 734 are inlet passages 738.

It is a particular feature of the manifold arrangement shown in FIGS. 17-19 that both inlet and outlet to the filter are provided through a single aperture in the housing 72.

It is a further particular feature of the present invention that shoulder 736 provides centering of the entire manifold assembly onto the housing 72. It is noted that shoulder 736 comprises a surface 740 which lies in a plane parallel to axis 118 which provides the desired centering.

Shoulder 736 also comprises a surface 742 which lies in a plane perpendicular to axis 118 and which lies over the edge of housing 72 adjacent to aperture 730, thereby pressing housing 72 against sealing ring 732 for providing desired sealing upon tight threaded engagement of the collar member 728 onto the body member 721.

It will be appreciated by persons skilled in the art that the present invention is not limited by what has been particularly shown and described hereinabove. Rather the scope of the invention is defined only by the claims which follow:

I claim:

1. A disk-type filter comprising:
    a housing having an inlet connectable to an upstream pipe and an outlet connectable to a downstream pipe; and
    a stack of filter units disposed within said housing for separating solid particles from a fluid flowing between filter units in said stack of filter units from an upstream side of said stack of filter units to a downstream side thereof,
    characterized in that said stack of filter units includes a plurality of co-operating filter units defining a plurality of paired co-operating filter surfaces, including first and second surfaces each defining a plurality of fingers, said fingers defined by said first surface being arranged in registration with said fingers defined by said second surface, the exteriors of said fingers defined by said first and second surfaces communicating with either one of an upstream side and a downstream side and the interiors of said fingers defined by said first and second surfaces communicating with the other one of said upstream side or downstream side, spaces being defined in association with said fingers defined by said first and second surfaces and being disposed in registration so as to define channels, which permit particulate matter to become disengaged with said upstream side of said fingers defined by said first and second surfaces.

2. Apparatus according to claim 1 and wherein said fingers defined by said first and second surfaces each have formed thereon a pair of spaced, generally raised line portions separated by an interior area, said raised line portions on at least one of said first and second surfaces defining a plurality of spaced grooves.

3. Apparatus according to claim 2 and wherein said raised line portions on both of said first and second surfaces define a plurality of spaced grooves, said plurality of grooves of said second surface facing said plurality of grooves of said first surface, said grooves of said second surface being mutually skewed with respect to said grooves of said first surface.

4. Apparatus according to claim 3 and wherein said pluralities of spaced grooves defined by said first and second surfaces define an enhanced depth filtering pathway.

5. Apparatus according to claim 2 and wherein said raised line portions define a continuous surface which separates the upstream side from the downstream side.

6. Apparatus according to claim 2 and wherein said raised line portions and grooves of said first and second surfaces define multiple branched paths for traversal of fluid from the upstream side to the downstream side.

7. Apparatus according to claim 2 and wherein there is provided a planar divider at said interior area of each of said fingers, such that when a plurality of filter units are disposed in registration, said line portions and said planar dividers define a multiplicity of backflow chambers for enhanced backflowing.

8. Apparatus according to claim 2 and wherein said raised line portions are of generally uniform thickness, thus providing a filtering barrier of generally uniform characteristics.

9. Apparatus according to claim 2 and wherein flushing chambers are defined between said line portions.

10. Apparatus according to claim 9 and wherein said flushing chambers are defined by planar dividers recessed with respect to said line portions on said first and second surfaces.

11. Apparatus according to claim 2 and wherein said line portions are formed in a pointed configuration facing the downstream side, thereby to minimize deflection of backflush streams.

12. Apparatus according to claim 1 and also comprising a filter aid operatively associated with said stack of filter units.

13. Apparatus according to claim 12 and wherein said filter aid is selected from diatomaceous earth, activated carbon and filter cake.

14. Apparatus according to claim 12 and wherein said filter aid is disposed upstream of said first and second surfaces, whereby in the absence of upstream to downstream fluid flow through said filter, said filter aid tends to disengage from said stack of filter units.

15. A disk-type filter according to claim 12 and wherein each said plurality of fingers is constructed to define outward facing surfaces and inward facing surfaces, said outward facing surfaces having a greater surface area than said inward facing surfaces, whereby during filtration operation of said filter, when a positive pressure differential is applied across said stack of filter units from said upstream side to said downstream side, said fingers are bent in a first sense from their steady state position, and upon elimination of said positive pressure differential, said fingers tend to snap back to their steady state position, thus enhancing removal of particulate matter therefrom.

16. Apparatus according to claim 1 and wherein said stack of filter units comprises a generally cylindrical element having an axial central bore along its longitudinal axis.

17. Apparatus according to claim 16 and also comprising means for providing a flushing fluid flow through said filter unit including a fluid discharge device arranged for axial movement along said bore.

18. Apparatus according to claim 17 and wherein said fluid discharge device comprises fluid driven means for providing rotation of a relatively high pressure flow about said longitudinal axis.

19. Apparatus according to claim 17 and wherein said fluid discharge device is manually manipulable for providing said axial movement along said bore.

20. A disk-type filter according to claim 1 and also comprising a manifold defining said inlet and said outlet in communication with said bottom of said housing.

21. A disk-type filter according to claim 20 and wherein said manifold is configured to provide a hydrocyclonic fluid flow.

22. A disk-type filter according to claim 20 and comprising means for azimuthally distributing fluid entering said filter.

23. A disk-type filter according to claim 20 and wherein said manifold provides a fluid inlet and a fluid outlet through a single aperture in said housing.

24. A disk-type filter according to claim 20 and wherein said manifold includes a body member and a collar member which are threadably joined so as to engage therebetween the edge of said housing adjacent an aperture formed therein in sealing engagement and to provide desired positioning of said manifold with respect thereto.

25. A disk-type filter according to claim 1 and also comprising a plurality of axial connecting elements which traverse said stack of filter units at locations intermediate inner and outer diameters of said stack of filter units.

26. A disk-type filter according to claim 25 and wherein said locations of said axial connecting elements communicate with said upstream side of said stack of filter units and are arranged so as not to interfere significantly with flushing of said stack of filter units.

27. Apparatus according to claim 1 and wherein the exterior of said fingers defined by said first and second surfaces communicates with the upstream side and the interior of said fingers defined by said first and second surfaces communicates with the downstream side of a fluid flow and said spaces define interstices between adjacent fingers.

28. Apparatus according to claim 1 and wherein the exterior of said fingers defined by said first and second surfaces communicates with the downstream side and the interior of said fingers defined by said first and second surfaces communicates with the upstream side of a fluid flow and said spaces define interstices between adjacent fingers.

29. Apparatus according to claim 1 and also comprising means for maintaining a plurality of said filter units in azimuthal registration.

30. Apparatus according to claim 1 and wherein said plurality of fingers is constructed with inwardly and outwardly facing surfaces, said outwardly facing surface being longer than said inwardly facing surface.

31. A disk-type filter according to claim 1 and wherein said plurality of co-operating filter units define a plurality of chambers having a relatively broad opening adjacent said downstream side and which narrow inwardly from said opening.

32. A disk-type filter according to claim 1 and wherein said plurality of fingers extend in a direction curved from the radial.

33. A disk-type filter according to claim 1 and wherein said plurality of fingers narrow as they extend outwardly.

34. A disk type filter according to claim 1 and wherein the thickness of said plurality of fingers is slightly less at their outward extent as compared to the thickness at their inward extent.

* * * * *